United States Patent
Malteste et al.

(10) Patent No.: US 6,758,506 B2
(45) Date of Patent: Jul. 6, 2004

(54) ENERGY ABSORBER FOR INTERPOSING BETWEEN A RIGID BEAM AND A BUMPER SKIN, AND AN ENERGY-ABSORBING ASSEMBLY

(75) Inventors: Stephane Malteste, Meximieux (FR); Thierry Roussel, Fayl la Foret (FR); Laurent Rocheblave, Brignais (FR); Thierry Cavillon, Jesseron (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/383,066

(22) Filed: Mar. 7, 2003

(65) Prior Publication Data

US 2004/0080167 A1 Apr. 29, 2004

(30) Foreign Application Priority Data

Mar. 8, 2002 (FR) .......................................... 02 02971

(51) Int. Cl.[7] .............................................. B60R 19/02
(52) U.S. Cl. ...................... 293/102; 293/120; 293/132; 296/187.04
(58) Field of Search ................................ 293/102, 120, 293/121, 122, 132, 136, 146; 296/187.01, 187.03, 187.04, 187.09

(56) References Cited

U.S. PATENT DOCUMENTS

| | | |
|---|---|---|
| 4,050,726 A | 9/1977 | Hablitzel |
| 4,925,224 A | 5/1990 | Smiszek |
| 5,201,912 A | 4/1993 | Terada et al. |
| 5,385,375 A * | 1/1995 | Morgan et al. ............ 293/109 |
| 6,099,055 A * | 8/2000 | Hirota et al. ............ 293/120 |
| 6,290,272 B1 * | 9/2001 | Braun ........................ 293/120 |
| 6,467,821 B2 * | 10/2002 | Hirota ....................... 293/120 |
| 6,551,540 B1 * | 4/2003 | Porter ....................... 264/255 |
| 2001/0054826 A1 | 12/2001 | Hirota |

FOREIGN PATENT DOCUMENTS

| | | | |
|---|---|---|---|
| EP | 0 462 450 A1 | 12/1991 | |
| GB | 002032575 A * | 5/1990 | ............... 293/102 |
| JP | 358180344 A * | 10/1983 | ............... 293/120 |
| JP | 359156845 A * | 9/1984 | ............... 293/102 |
| JP | 404252755 A * | 9/1992 | ............... 293/149 |
| JP | 405097007 A * | 4/1993 | ............... 293/149 |
| JP | 405097008 A * | 4/1993 | ............... 293/149 |
| JP | 105112190 A * | 5/1993 | ............... 293/149 |

OTHER PUBLICATIONS http://www.nhtsa.dot.gov/cars/problems.studies.Bumper/Index.html□□Bumper Questions and Answers, Dec. 24, 2003.*

* cited by examiner

Primary Examiner—D. Glenn Dayoan
Assistant Examiner—H. Gutman
(74) Attorney, Agent, or Firm—Oliff & Berridge, PLC

(57) ABSTRACT

The energy absorber is provided for interposing between a rigid beam and a bumper skin in order to absorb, by compression, the energy of impacts directed in a crumpling direction. The energy absorber comprises a set of ribs each of which extends parallel to the crumpling direction and each of which possesses a free edge for pressing against the beam. The set of ribs includes at least one rib arranged in the event of an impact so that its free edge remains pressed against the beam, while the rib itself buckles, and at least one other rib arranged in such a manner that in the event of an impact, its free end escapes from the beam, causing the rib to bend.

4 Claims, 3 Drawing Sheets

ENERGY ABSORBER FOR INTERPOSING BETWEEN A RIGID BEAM AND A BUMPER SKIN, AND AN ENERGY-ABSORBING ASSEMBLY

The present invention relates to an energy absorber and to an assembly constituted by an energy absorber and a rigid beam.

BACKGROUND OF THE INVENTION

A bumper comprises an outer decorative covering, referred to as a "skin", and an inner system for absorbing energy which, by deforming, consumes as much as possible of the energy of an impact so as to transmit as little as possible thereof to the vehicle.

In terms of impact, car manufacturers implement a set of specifications that envisage three categories of impact, namely: high speed impacts corresponding to a head-on impact of the vehicle against a rigid or deformable obstacle at a speed of 56 kilometers per hour (km/h) to 64 km/h, "insurance" impacts such as those known as "Danner" impacts, at 15 km/h against a fixed wall, and small impacts or "parking bumps" at a speed lying in the range 4 km/h to 8 km/h, such as defined in the standard ECE R42.

High speed impacts are taken into consideration for the purpose of protecting the occupants of the vehicle, whereas "insurance" and "parking" impacts, i.e. "small" impacts correspond rather to the purpose of reducing repair costs.

High speed impacts are managed by associating the structure of the vehicle with safety systems that are included in the vehicle cabin.

"Insurance" impacts are managed by combining siderail extenders with the impact beam of the vehicle;

"Parking" bumps are sometimes managed by absorber systems placed between the skin and the beam of the vehicle, in the form of injected honeycomb structures.

The above types of impact are now associated with new requirements relating to impacts against pedestrians. Managing a pedestrian impact requires systems to be made more flexible and for them to behave in uniform manner over the entire width of the vehicle since such an impact must protect the pedestrian's legs so as to limit severe and handicapping injuries. For this purpose, it is general practice to use a foam obtained by expanding a thermoplastic (polyphenylene ether (PPE) foam).

To reconcile the requirements relating to the above-mentioned impacts with those relating to pedestrian impacts, it is common practice to make a stack of a traditional system with a layer of foam. The foam absorbs the energy of pedestrian impacts, while the traditional system operates in the event of a higher energy impact, after the foam has been pressed in.

One of the problems with such a stack is its cost, which is very high, particularly because of the cost of the foam and of the handling that is needed for putting it into place on the system.

Another problem results from the depth which is needed to make the layer of foam effective. This dimension is directly related to the intrinsic characteristics of the material which define its ability to absorb energy and its maximum compression ratio. This leads to the front of the vehicle being made relatively large.

OBJECTS AND SUMMARY OF THE INVENTION

The present invention seeks to propose a novel configuration for absorbers that comply with requirements concerning impacts in all of the above-mentioned categories of impact, but which is particularly simple and much less expensive to implement.

The present invention provides an energy absorber for interposing between a bumper skin and a rigid beam, the beam having a bearing surface and at least one corner that presents an escape surface, the function of the energy absorber being to absorb by compression the energy of impacts directed along a crumpling direction and the absorber comprising a set of ribs, each of which extends parallel to the crumpling direction and presents a free edge for bearing against the beam.

In this energy absorber, said set of ribs comprises at least one rib arranged, in the event of an impact, so that its free edge remains pressed against the beam while said rib buckles, and at least one rib arranged in such a manner that in the event of an impact its free end begins by escaping from the beam by sliding over the escape surface, after which said rib slides over the corner of the beam and bends, moving further and further away from the crumpling direction.

The energy absorber of the invention does not require the presence of any foam and it can be obtained directly by molding plastics material under the same conditions as apply to molding the prior art honeycomb structure.

That is why the energy absorber of the invention is very inexpensive to provide.

The originality of the energy absorber of the invention lies in the fact that it has two types of rib, namely: one or more buckling ribs which, as in a honeycomb, absorb impact energy by compressing axially, and bending ribs which, unlike honeycomb ribs, slide over the corner of the beam with a friction force that increases as the beam gets closer to the base of the rib in question, since said rib forms an increasing angle relative to the direction of impact.

The advantage of these bending ribs is that they provide resistance to deformation that increases with increasing deformation of the energy absorber, which behavior is the converse of that of a buckling rib.

This makes it possible to reproduce the behavior of a foam without needing to use such a material.

In a particular embodiment of the invention, at least one of the ribs has a base portion, remote from its free edge, and provided with transverse stiffener means.

These transverse stiffening means reconstitute a honeycomb structure in the base portion of the rib.

In the invention, it is important for this base portion to extend over part of the rib only, since the rib must also have an end portion suitable for buckling or for bending in the vertical direction.

The invention also provides an assembly constituted by an energy absorber and a rigid beam having a bearing surface and at least one corner presenting an escape surface, for placing behind a bumper skin to absorb impact energy directed in a crumpling direction, the energy absorber comprising a set of ribs each of which extends parallel to the crumpling direction and possesses a free edge bearing against the beam, wherein the bearing surface of the beam is shaped in such a manner that the free edge of one rib cannot slide laterally over the beam in the event of crumpling in the crumpling direction, such that said rib buckles, wherein the corner of the beam is shaped in such a manner that in the event of crumpling in the crumpling direction, the free edge of a rib of the energy absorber escapes laterally from the beam by sliding over the escape surface, said rib then sliding over the corner and bending while moving further and further away from the crumpling direction, and wherein said set of ribs includes at least one rib arranged so that its edge bears against said corner surface of the beam, and at least one rib arranged so that its free edge bears against said bearing surface of the beam.

Advantageously, the bearing surface of the beam is constituted by a concave shape which holds the free ends of the ribs that are designed to buckle in order to prevent them from escaping from the beam, and thus prevent them from behaving like bending ribs.

BRIEF DESCRIPTION OF THE DRAWINGS

In order to make the invention easier to understand, there follows a description of an embodiment given by way of non-limiting example, with reference to the accompanying drawings, in which.

MORE DETAILED DESCRIPTION

Figure 1:
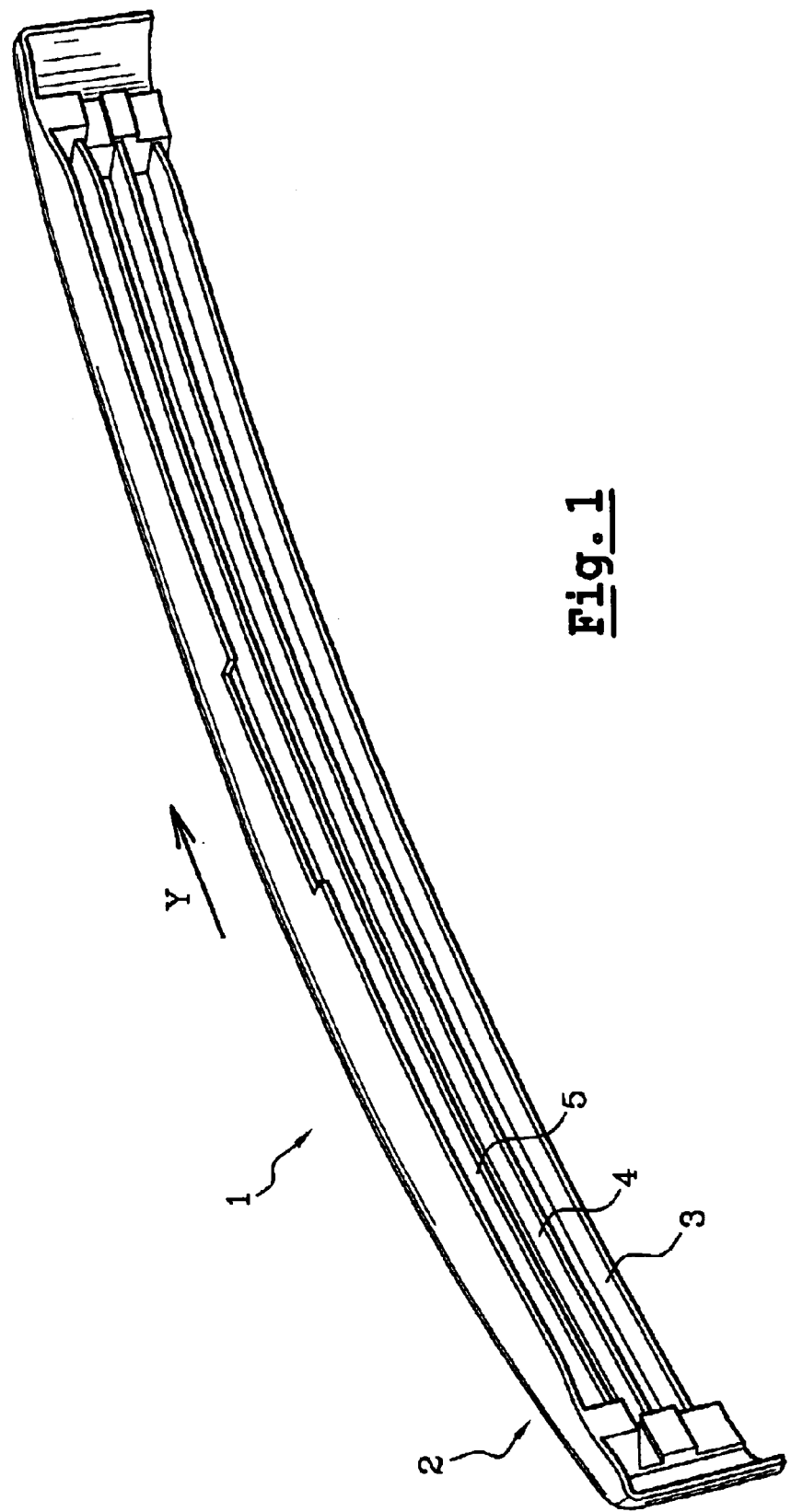
FIG. 1 is a perspective view of an energy absorber of the invention.

The energy absorber of FIG. 1 presents a longitudinal direction Y which corresponds to the transverse direction of the vehicle.

It is made by injecting polypropylene or polyethylene under conventional conditions for thermoplastic injection molding.

It has a front plate 2 and three longitudinal ribs or webs 3, 4, and 5 that are parallel to one another and horizontal when the energy absorber is mounted on a vehicle.

In the example shown, the top and bottom ribs 5 and 3 are themselves provided with vertical reinforcing ribs 6 occupying their base portions, and in this case extending over about half of each rib. The middle rib 4 does not have any vertical reinforcing rib.

Figure 2:
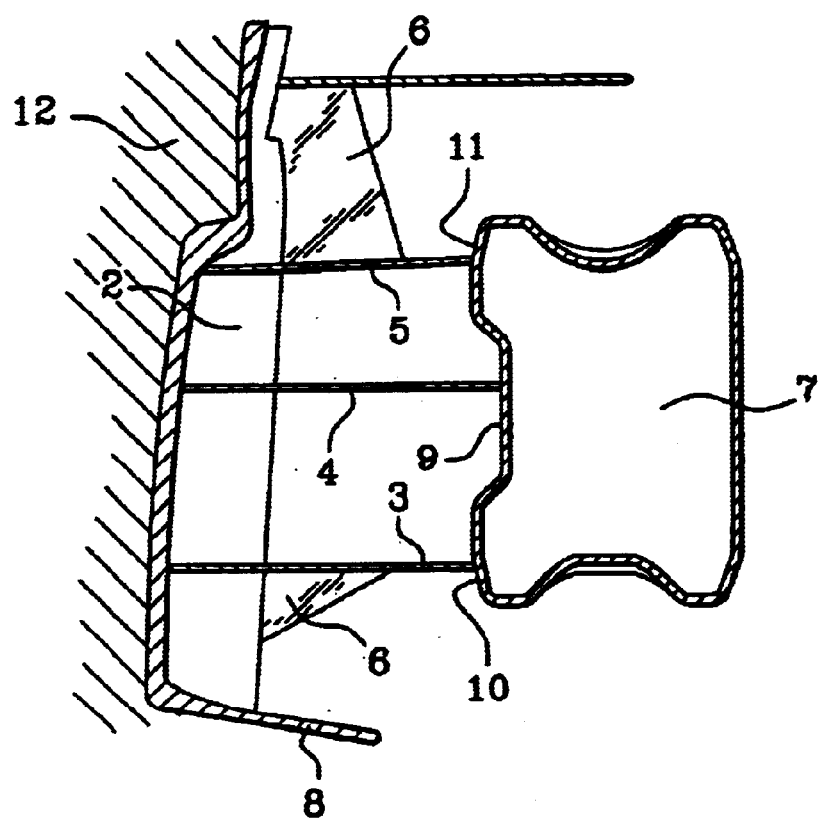
FIG. 2 is a section view of the FIG. 1 absorber mounted in a bumper skin in front of an impact beam.
Figure 3:
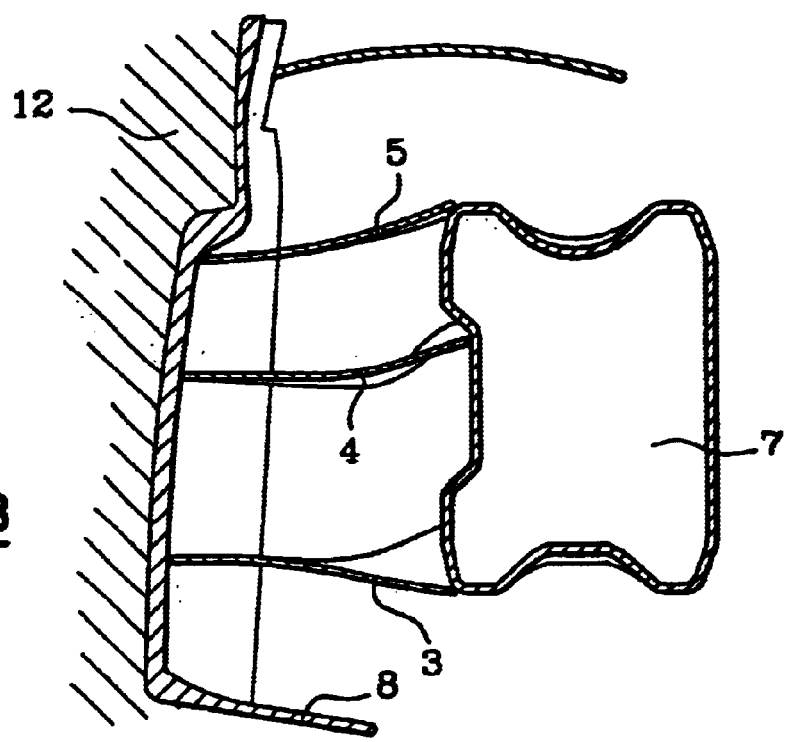
FIG. 3 is a view analogous to FIG. 2, showing the energy absorption system while it is crumpling.
Figure 4:
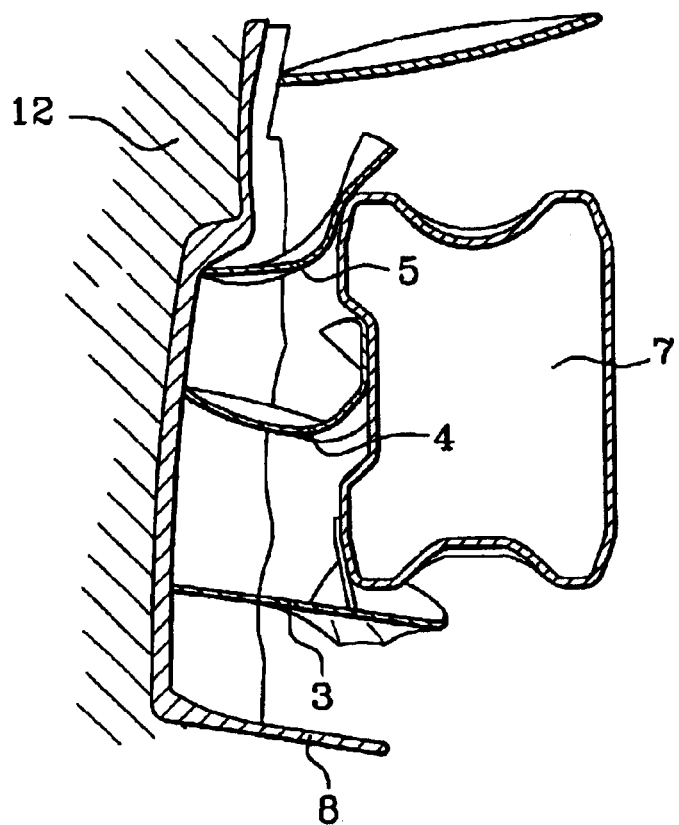
FIG. 4 is a view analogous to FIG. 3 at a later stage during crumpling.
Figure 5:
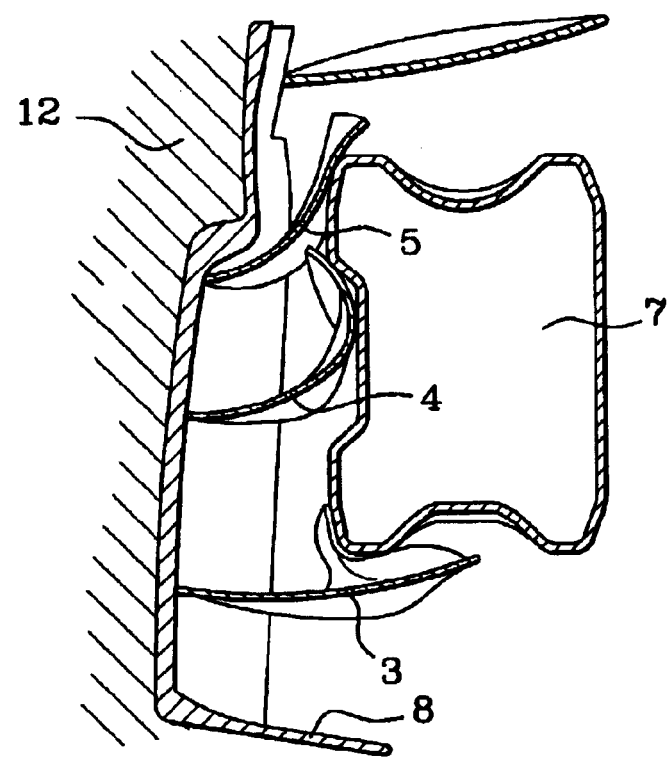
FIG. 5 is a view analogous to FIG. 4, at a later stage during crumpling.

As can be seen more clearly in the section of FIG. 2, the middle rib 4 is slightly longer than the upper and lower ribs. This difference in length is justified by the shape of the impact beam 7 against which the energy absorber takes its position when mounted inside the skin 8 of the bumper.

The beam 7 presents a bearing surface 9 for the energy absorber that is constituted by a concave shape with the hollow side of this concave shape receiving the middle rib 4, and lying between two corners, a top corner 11 and a bottom corner 10, each providing a slightly chamfered escape surface.

The behavior of the energy absorber assembly as formed by the impact beam 7, the energy absorber 1, and the skin B is described below in the event of an impact against an obstacle 12.

At the beginning of the impact, the bumper skin 8 is pressed in and the plate 2 of the energy absorber moves closer to the impact beam. The top and bottom ribs 5 and 3 slide over the escape surfaces of the corners 11 and 10 of the corresponding beam and become retracted out of the way respectively upwards and downwards because of the chamfers.

Simultaneously, the middle rib 4, which is centered on the impact beam, comes into abutment against the bottom of the recess 9 and buckles, while continuing to press against said bottom.

During the impact, the top and bottom ribs 5 and 3 slide over the corners of the impact beam, spreading further and further away from the horizontal direction because the top corner 11 is higher than the top rib 5 and the bottom corner 10 is lower than the bottom rib 4. The sliding of each web over each corner is consequently accompanied by friction which increases as the impact absorber becomes pressed against the cross-member. The top and bottom webs 5 and 3 act as bending ribs.

Simultaneously, the middle web 4 which buckles while remaining in the recess 9 of the bearing surface of the beam offers less and less resistance to crumpling and consequently absorbs a decreasing amount of energy.

In comparison with an energy absorber fitted with foam, and with an energy absorber fitted with a honeycomb array of ribs, tests performed with the above-described energy absorption system show that the energy absorber configuration of the invention gives results that are entirely satisfactory and comparable or even better in some cases to those given by energy absorbers of the prior art.

Naturally, the embodiments described above are not limiting in any way and may be subjected to any desirable modification without thereby going beyond the ambit of the invention.

What is claimed is:

1. An energy absorber for interposing between a bumper skin and a rigid beam, the beam having a bearing surface and at least one corner that presents an escape surface, the function of the energy absorber being to absorb by compression the energy of impacts directed along a crumpling direction and the absorber comprising a set of ribs, each of which extends parallel to the crumpling direction and presents a free edge for bearing against the beam, wherein said set of ribs comprises at least one rib arranged, in the event of an impact, so that its free edge remains pressed against the beam while said rib buckles, and at least one rib arranged in such a manner that in the event of an impact its free end begins by escaping from the beam by sliding over the escape surface, after which said rib slides over the corner of the beam and bends, moving further and further away from the crumpling direction.

2. An energy absorber according to claim 1, in which at least one of the ribs has a base portion, remote from its free edge, and provided with transverse stiffener means.

3. An assembly constituted by an energy absorber and a rigid beam having a bearing surface and at least one corner presenting an escape surface, for placing behind a bumper skin to absorb impact energy directed in a crumpling direction, the energy absorber comprising a set of ribs each of which extends parallel to the crumpling direction and possesses a free edge bearing against the beam, wherein the bearing surface of the beam is shaped in such a manner that the free edge of one rib cannot slide laterally over the beam in the event of crumpling in the crumpling direction, such that said rib buckles, wherein the corner of the beam is shaped in such a manner that in the event of crumpling in the crumpling direction, the free edge of another rib of the energy absorber escapes laterally from the beam by sliding over the escape surface, said other rib then sliding over the corner and bending while moving further and further away from the crumpling direction, and wherein said set of ribs includes at least said other rib arranged so that its free edge bears against said corner surface of the beam, and at least said one rib arranged so that its free edge bears against said bearing surface of the beam.

4. An assembly according to claim 3, in which the bearing surface of the beam is constituted by a concave shape.

* * * * *